B. HAYWOOD.
Coal Breaker.
No. 4,058.
Patented May 21, 1845.
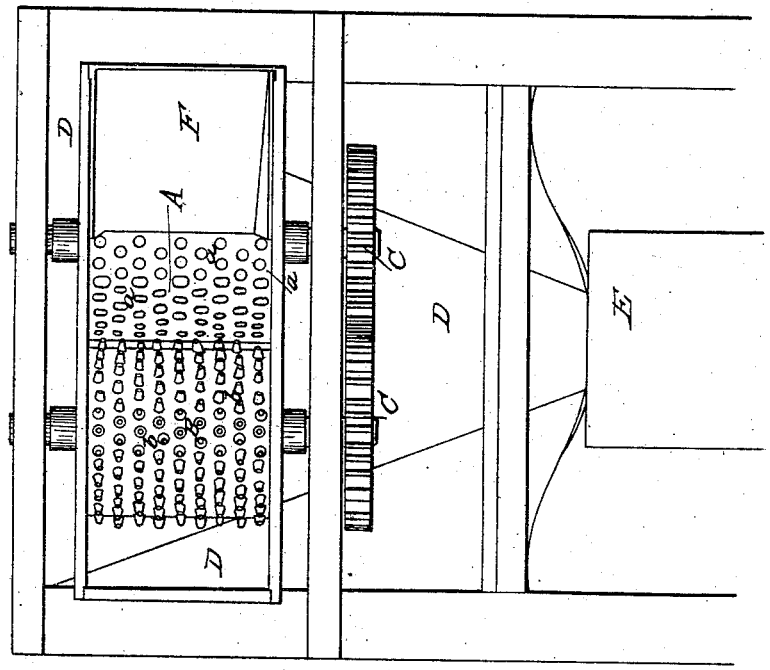
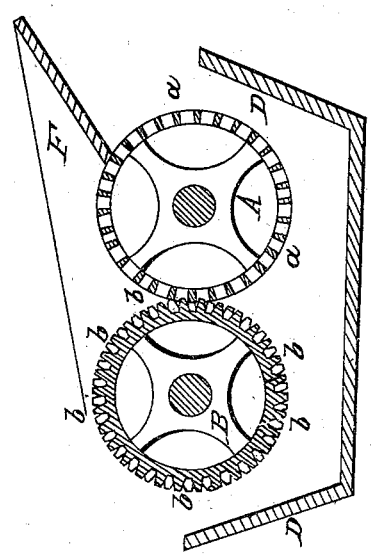

UNITED STATES PATENT OFFICE.

BENJAMIN HAYWOOD, OF POTTSVILLE, PENNSYLVANIA.

COAL-BREAKER.

Specification of Letters Patent No. 4,058, dated May 21, 1845.

*To all whom it may concern:*

Be it known that I, BENJAMIN HAYWOOD, of Pottsville, in the county of Schuylkill, in the State of Pennsylvania, have invented a new and useful Improvement in the Manner of Constructing Machines for the Breaking of Anthracite or Stone Coal; and I do hereby declare that the following is a full and exact description thereof.

My improvement on the above named machine, consists in the employment of pairs of breaking rollers of cast-iron, which rollers may be three feet in diameter, more or less. One of them I make hollow, and with its cylindrical periphery about an inch, or an inch and a half, thick; and this I perforate, over its whole surface, with holes, say, of from two inches and a half to three inches in diameter; these holes may be round, or polygonal, but I prefer the latter form, as the spaces between said holes may then be made equal in thickness, which thickness need not exceed half an inch. I make these holes somewhat larger on the inside of the cylinder than on the outside, so that the broken coal may pass freely through them; to diminish the flat surface on the periphery, however, I sometimes slightly countersink said holes at their entrance, say to the depth of the fourth of an inch. The second roller I cover with teeth which may be about two inches long; these teeth are usually the same in number with, and are to correspond to, the holes in the hollow roller, into which their outer ends are to pass as the rollers revolve. The teeth may be two inches long, and enter the holes to the distance of half an inch, more or less; their outer ends are to be flat, and may be about an inch in diameter. To cause the teeth to enter the holes centrically, I gear the two wheels together, by means of cogged wheels, as described in the specification of Joseph Battin's machine above named; the spaces between the holes in the perforated roller passing between the teeth of the toothed roller.

The axes of the wheels may be on the same horizontal plane; or that having the teeth on it may be raised above the other, so as that its axis may stand in a plane of an inclination of forty five degrees, more or less, above it; the upper roller will then operate as one side of a hopper, in feeding the coal. There is, of course, to be a hopper, or trough, used to receive the coal which is to be broken by the rollers.

In the accompanying drawing Figure 1, is a top view of my breaking rollers, and Fig. 2, a vertical, transverse section through them.

A, is the perforated roller, having holes, $a, a$, through it.

B, is the toothed roller, having its periphery covered with teeth, $b, b$; C, C, are gearing wheels by means of which the rollers are kept in their proper positions in relation to each other. The coal which passes through the openings, $a, a$, may fall out at either end of it upon an inclined plane, or trough, D, D, and be by it conducted to a rolling screen, one end of which is shown at E.

The trough, or hopper, by which the coal to be broken is conducted on to the rollers is shown at F.

Having thus fully described the nature and operation of my improvement on the above named machine for breaking anthracite, or stone coal, what I claim therein as new, and desire to secure by Letters Patent, is—

The employment of pairs of rollers, to effect the breaking; one of which rollers, instead of being furnished with teeth, is perforated with holes through which the broken coal is to pass, the other roller being provided with teeth, corresponding with, and entering a short distance into, the holes in the first named roller, in the manner, and for the purpose, set forth; said rollers being geared together, and otherwise operating, in the same manner as the within named machine of Joseph Battin.

BENJN. HAYWOOD.

Witnesses:
RICHD. LEE,
DANL. R. BENNETT.